Nov. 8, 1966 H. FUCHS ETAL 3,283,742
APPARATUS FOR THE IMPREGNATION OF ELECTRIC WINDINGS
Filed Jan. 9, 1963 2 Sheets-Sheet 1

Heinz Fuchs,
Heinz Baer and
Paul Kolaczek,
INVENTORS
BY Wanderoth, Lind and Ponack
ATTORNEYS Heinz Fuchs,
Heinz Baer and
Paul Kolaczek,
INVENTORS

United States Patent Office 3,283,742
Patented Nov. 8, 1966

3,283,742
APPARATUS FOR THE IMPREGNATION OF ELECTRIC WINDINGS
Heinz Fuchs, Riehen, Switzerland, and Heinz Baer and Paul Kolaczek, Weingarten, Germany, assignors to Josef Baer Maschinenfabrik, Weingarten, Germany, a firm of Germany
Filed Jan. 9, 1963, Ser. No. 250,366
Claims priority, application Switzerland, Jan. 15, 1962, 500/62
1 Claim. (Cl. 118—322)

This invention relates to methods and apparatus for impregnating electric windings.

The impregnation of electric windings, for example rotor and stator windings of electric motors, serves to preserve a satisfactory state of insulation of the winding and to strengthen mechanically the winding structure. In order to achieve a satisfactory state of insulation, it is necessary for all apertures and pores of the winding to be filled by the impregnating agent. Suitable impregnating agents are resin/hardener mixtures such as disclosed in U.S. Patent 3,071,496 to Fromm et al., which do not contain solvents because they are of sufficiently low viscosity during pouring to penetrate even in the finest aperture and pore, and also because they harden without shrinkage. Moreover, the resin/hardener mixtures have a sufficiently high mechanical strength which is important in the case of fast-running rotor windings.

Various methods for impregnating electric windings are already known. In the so-called drip process the resin/hardener mixture is allowed to drip on one end of a heated rotating winding element. Under the influence of gravity and of capillary forces the resin-hardener mixture flows through the winding until it is thoroughly impregnated. This is followed by the setting of the resin/hardener mixture, preferably at an elevated temperature.

The present invention relates to a method of this kind for impregnating electric windings with a resin/hardener mixture, said mixture being poured on to the windings which rotate about their longitudinal axes, and is characterised in that an identical amount of resin/hardener mixture is allowed to flow on to each winding, the rate of flow being kept constant by positive means.

The invention also relates to an automatically operating machine for carrying out the above method and is characterised by an intermittently advanced belt with support devices for the windings and at least one unit consisting of a dosing pump for the resin, a dosing pump for the hardener, a mixing device and a pouring orifice.

Figure 1:
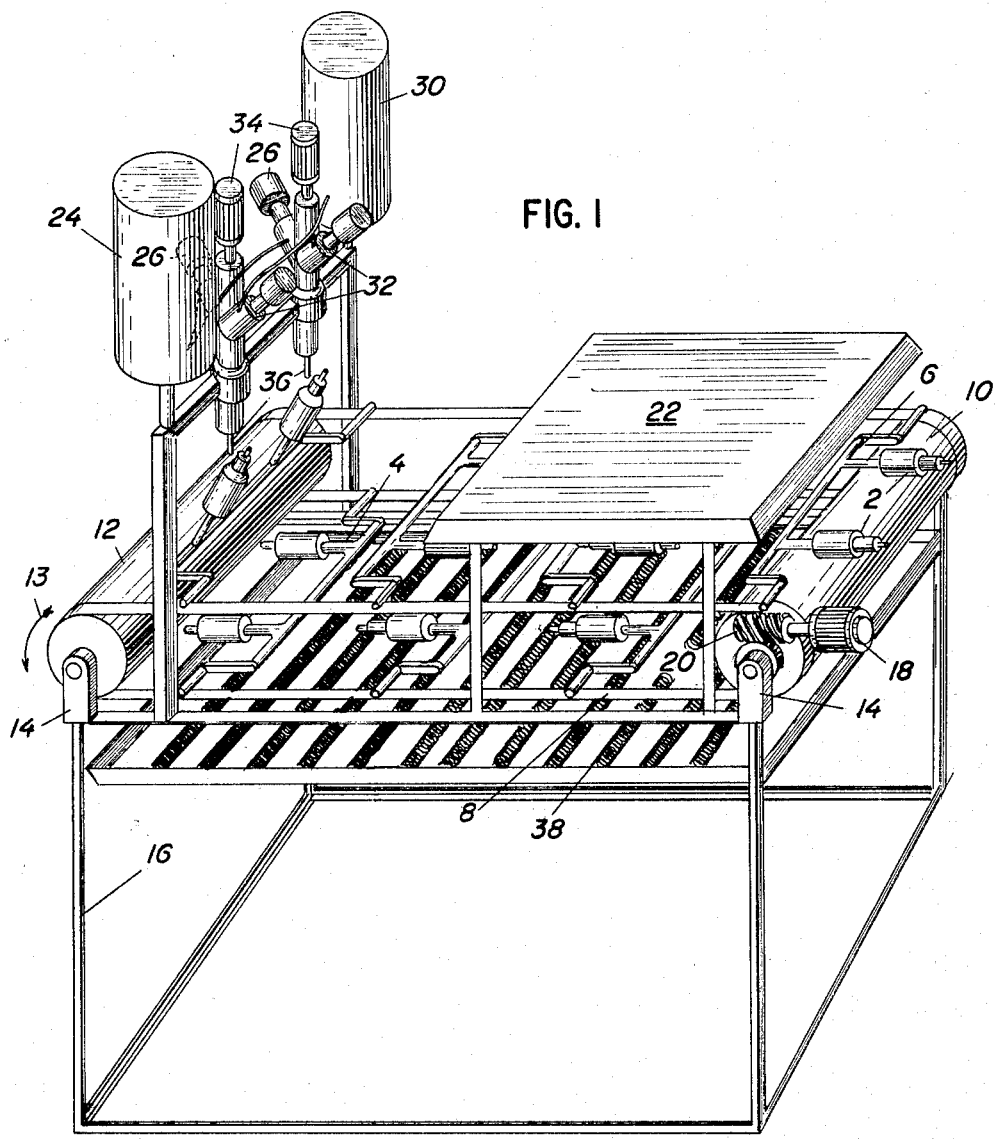
Figure 2:
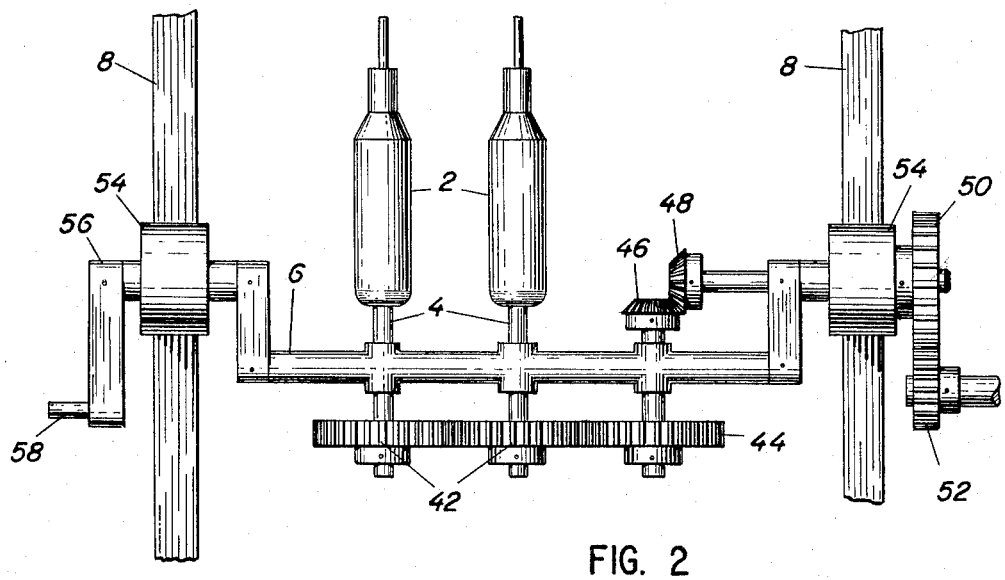
Figure 3:
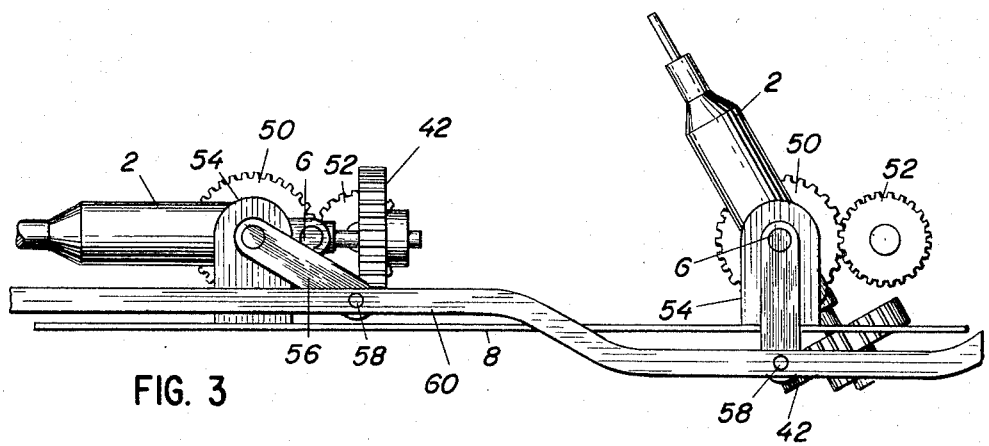

A machine embodying the invention will now be further explained by way of example only with reference to the accompanying drawings of which FIG. 1 is a perspective view of the machine in schematic form only, FIG. 2 is a plan view of drive mechanism for rotating windings during impregnation, and, FIG. 3 is a side elevation of a device for inclining the the windings during impregnation.

FIG. 1 illustrates one embodiment of the invention which is suitable for the impregnation of the rotors of electric motors. The rotors 2 are slipped on to supports 4 at the right end of the machine (as viewed in FIG. 1) the supports being mounted on bars 6. The bars 6 extend transversely between conveyor belts 8 and are attached thereto in rotatable manner. A plurality of such bars 6 are distributed at uniform intervals over the entire lengths of the conveyor belts 8. The conveyor belts 8 revolve around a drive roller 10 and an idler roller 12 in the direction of arrow 13. The two rollers are rotatably supported in bearings 14 which are mounted on the frame 16. The drive roller 10 is intermittently driven by an electric motor 18 through a worm drive 20. The intermittent actuation may, for example, be effected by means of a time switch controlling the energisation of motor 18. The rotors 2 first pass under a heater 22 emitting radiant heat, and are thus heated to a desired temperature.

Resin is in a container 24 and is pumped into a mixer 28 by means of a metering pump 26. Hardener is fed from a container 30 through a metering pump 32 into the mixer 28. As the resin and hardener pass through the mixer 28, they are mixed with one another by means of an agitator driven by an electric motor 34. The mixture passes through a pouring orifice 36 on to the rotor to be impregnated, which is situated directly below it. The inner volume of the mixer is preferably kept as small as possible. In this way, it is possible to mix the resin and hardener immediately prior to pouring.

In the drawing are shown two units for dosing, mixing and pouring the resin/hardener mixture, so that two rotors may be impregnated at one and the same time. Obviously, the machine may be equipped with only one or, on the other hand, with a plurality of such units, depending upon the desired performance. The units need not be arranged beside one another, as shown in the drawing, but may also be grouped behind one another in the direction in which the conveyor belt travels.

The construction of the machine allows the setting to a desired value of the amount of mixture to be poured on to each rotor, and of the rate at which the mixture is poured. Since the metering pumps convey the mixture directly on to the rotor to be impregnated through the mixer and the pouring orifice, the pouring rate is governed by the delivery setting of the metering pump and this may be regulated by suitable setting of the pump. The metering pumps are stopped, for example by time switches, as soon as the desired amount of resin/hardener mixture has been poured on to the rotor. Then the conveyor belts advance another step, i.e. until the two rotors placed on the next-following bar are positioned below the two pouring orifices 36. To prevent the pouring orifices from dripping during the period in which no rotors are placed below them, the pouring orifices are preferably closed during this time, for example by pinching resilient flow tubes fitted just prior to the orifices. As they are advanced further (on the lower return portions of the conveyor belts in the drawing), the rotors may move again into the range of a heater 38 emitting radiant heat. After having passed through this lower (heated or unheated) section the resin/hardener mixture is sufficiently firm for the rotors to be removed from the machine, that is at the right end of the machine in the drawing. Final hardening takes place afterwards, for example in an oven or by extending the heating section on the machine itself. It is also possible, however, to carry out final hardening at room temperature.

In order to achieve complete impregnation of the windings, it is necessary in this process that the windings should be rotated about their longitudinal axes during pouring, and that their longitudinal axes should be inclined relatively to the horizontal.

FIGS. 2 and 3 show one method of generating the movements. Rotors 2 to be impregnated are mounted on supports 4 rotatably attached to bars 6. Each support is provided with a toothed gear 42 which meshes directly or indirectly with a toothed gear 44. The toothed gear 44 is driven by a gear 52 by means of two bevel gears 46 and 48 and a toothed gear 50. The gear 52 is supported on the frame of the machine and is engaged only in the impregnating position. Thus, a rotary movement about their longitudinal axes to the rotors is imparted to the rotors in the impregnating position. Instead of gear 52 there may be used a plurality of such gears or an endless chain in which case the rotors 2 rotate also after impregnation.

The bar 6 is rotatably attached to the conveyor belts 8 by means of two bearings 54. At one end of the bar 6 is attached a lever arm 56 which has a pin 58 guided along in a fixed guide rail 60. As the conveyor belts 8 travel along, the pin slides along the guide rail 60 and, because the latter is shaped as shown, produces a rotary movement of the bar 6.

FIG. 3 shows how a rotor moves from the horizontal position into the inclined position desirable during the pouring of the resin/hardener mixture.

FIG. 2 shows that the two bevel gears 46 and 48 which are required to produce the rotary movement of the rotors remain engaged with one another irrespectively of the position of the bar 6.

The machine described above with respect to the drawings offers several advantages. Owing to the fact that the pouring rate for each winding is kept constant by positive means,, i.e. the metering pumps, during the pouring time, each winding is impregnated with exactly the same amount of resin/hardener mixture, irrespective of the momentary rheologic behaviour of the latter. In this way an equally satisfactory state of impregnation is ensured for each winding. According to known methods, funnels are employed for the pouring of the resin/hardener mixture, the latter dripping on to the windings due to gravity. Obviously the pouring rate must vary in such a process as soon as the viscosity of the resin varies, perhaps through external influences such as varying room temperatures. The pouring rate will also vary when the aperture of the funnel decreases due to incrustation or soiling. In the machine described above, variation of the viscosity and decrease of the cross-sectional area of the orifice, if it occurs, are of rather secondary importance, because the forced flow of the resin achieved by the metering pumps makes the pouring rate independent of gravity.

A further advantage of the machine lies in the fact that the pouring rate can be set in such a way as to achieve maximum performance of the machine, without losing any of the resin/hardener mixture due to dripping from the windings. As the metering pumps only operate during pouring, no resin/hardener mixture is lost during the period in which there is no winding under the pouring orifice. A further advantage is that resin and hardener are mixed with one another shortly before pouring. By interlocking the machine movement with the metering pumps etc., there is no resin/hardener mixture which could set during machine stoppage and which would be wasted and, moreover would have to be removed in a difficult operation before the machine was restarted.

What is claimed:

In a machine for impregnating electric windings with a resin/hardener mixture, the combination of an intermittently advanceable supporting structure for the electric windings, at least two impregnating units each consisting of a metering pump for the resin, a metering pump for the hardener, a mixing device to which said pumps are connected, and an outlet nozzle on said mixing device, and positioned over the path of the supporting structure at positions spaced from each other transversely of the direction of said supporting structure for pouring the resin/hardener mixture at a constant output velocity through the outlet nozzles, a plurality of winding support members on said supporting structure which are advanced simultaneously, said winding support members being at positions on said supporting structure such that a member of said support members corresponding to the number of impregnating units are advanced to the impregnating position at each intermittent advance of said supporting structure, the outlet nozzle of each impregnating unit being positioned above an associated winding support member when the latter is in the impregnating position so that, in use, all windings simultaneously advanced to the impregnating position are each simultaneously impregnated by their associated impregnating unit with resin/hardener mixture poured at a constant rate, and support member rotating and tilting means on the supporting structure and coupled to each winding support member for rotating the windings about their longitudinal axes, and simultaneously inclining the longitudinal axes of the windings relative to the horizontal at least during impregnation.

References Cited by the Examiner
UNITED STATES PATENTS

| | | | |
|---|---|---|---|
| 2,148,558 | 2/1939 | Huebner | 118—56 X |
| 2,561,982 | 7/1951 | Hanna et el. | 117—232 X |
| 2,763,575 | 9/1956 | Bede | 117—105.3 X |
| 2,804,404 | 8/1957 | Thiessen | 117—213 |
| 3,071,496 | 1/1963 | Fromm et al. | 117—119 X |
| 3,097,764 | 7/1963 | Loeser | 222—55 |
| 3,194,416 | 7/1965 | Arnold et al. | 118—56 X |

ALFRED L. LEAVITT, *Primary Examiner.*

RICHARD D. NEVIUS, MURRAY KATZ, *Examiners.*

A. GOLIAN, *Assistant Examiner.*